(12) United States Patent
Rota

(10) Patent No.: US 7,451,693 B2
(45) Date of Patent: Nov. 18, 2008

(54) COMPACTING MACHINE WITH REDUCED FRICTION

(75) Inventor: Guido Rota, Via Paolo Gasparotto (IT)

(73) Assignee: CAEB International S.r.l., Milan (IT)

( * ) Notice: Subject to any disclaimer, the term of this patent is extended or adjusted under 35 U.S.C. 154(b) by 0 days.

(21) Appl. No.: 11/665,266

(22) PCT Filed: Jan. 14, 2005

(86) PCT No.: PCT/IT2005/000016

§ 371 (c)(1),
(2), (4) Date: Apr. 12, 2007

(87) PCT Pub. No.: WO2006/040783

PCT Pub. Date: Apr. 20, 2006

(65) Prior Publication Data

US 2007/0261572 A1    Nov. 15, 2007

(30) Foreign Application Priority Data

Oct. 15, 2004   (IT)   .......................... MI2004A1969

(51) Int. Cl.
*B30B 3/06* (2006.01)
(52) U.S. Cl. .............................. 100/89; 100/177; 56/341
(58) Field of Classification Search ...................... 100/5, 100/15, 87, 88, 89, 177; 56/341; 53/118, 53/211

See application file for complete search history.

(56) References Cited

U.S. PATENT DOCUMENTS

| 331,932 | A | * | 12/1885 | Workman ..................... | 100/89 |
| 653,191 | A | * | 7/1900 | Treese .......................... | 100/89 |
| 980,706 | A | * | 1/1911 | Treese .......................... | 100/89 |
| 4,334,467 | A | * | 6/1982 | Nishibe et al. ................ | 100/89 |
| 6,425,322 | B1 | | 7/2002 | Karlsson et al. | |
| 7,156,015 | B2 | * | 1/2007 | McHale et al. ................ | 100/89 |
| 2004/0000131 | A1 | | 1/2004 | Viaud et al. | |

FOREIGN PATENT DOCUMENTS

| DE | 28 07 058 A1 | 8/1979 |
| DE | 39 20 377 A1 | 1/1991 |
| EP | 0 745 318 A | 12/1996 |
| GB | 1 549 899 A | 8/1979 |

OTHER PUBLICATIONS

International Search Report for PCT/IT2005/000016 mailed Jul. 11, 2005.

* cited by examiner

*Primary Examiner*—Jimmy T Nguyen
(74) *Attorney, Agent, or Firm*—Nixon & Vanderhye, P.C.

(57) ABSTRACT

Compacting machine comprising a compaction chamber connected to introduction means arranged to forcedly introduce a predetermined quantity of material to be compacted into the compaction chamber by conferring on the material a substantially rotary movement, the compaction chamber comprising at least one plate made to rotate about an axis perpendicular to the plate and arranged to at least partly close the compaction chamber laterally.

14 Claims, 4 Drawing Sheets

COMPACTING MACHINE WITH REDUCED FRICTION

This application is the U.S. national phase of International Application No. PCT/IT2005/000016 filed 14 Jan. 2005 which designated the U.S. and claims priority to IT MI2004 A001969 filed 15 Oct. 2004, the entire contents of each of which are hereby incorporated by reference.

TECHNICAL FIELD

The present invention relates to a compacting machine.

PRIOR ART

In the state of the art, the machines used for compacting miscellaneous material, such as hay, shrubs, etc., comprise an entry mouth with a rotating roller which feeds the hay into a substantially cylindrical compacting chamber of horizontal axis bounded at its lateral surface by a plurality of motorized rollers rotating about their axis parallel to the axis of the compaction compartment.

The ends of the compaction compartment consist of fixed walls against which the material to be compacted presses and rubs.

These end walls are therefore subjected to considerable wear and pressure.

Said rubbing of the material during compaction also results in energy dissipation and a greater power requirement for the machine.

DISCLOSURE OF THE INVENTION

An object of the present invention is to provide a compacting machine free of said defects.

A particular object is to provide a compacting machine which requires lesser force and drive power.

Another object is to provide a compacting machine with a compaction compartment the end walls of which are subjected to lesser wear.

A further object is to provide a machine which facilitates material compaction, and facilitates material exit when compaction has taken place.

Said objects area attained by a compacting machine the inventive characteristics of which are defined by the claims.

BRIEF DESCRIPTION OF THE DRAWINGS

The invention will be more apparent from the ensuing detailed description of a preferred embodiment thereof provided by way of non-limiting example and illustrated in the accompanying drawings, in which.

BEST MODE FOR CARRYING OUT THE INVENTION

Figure 1:
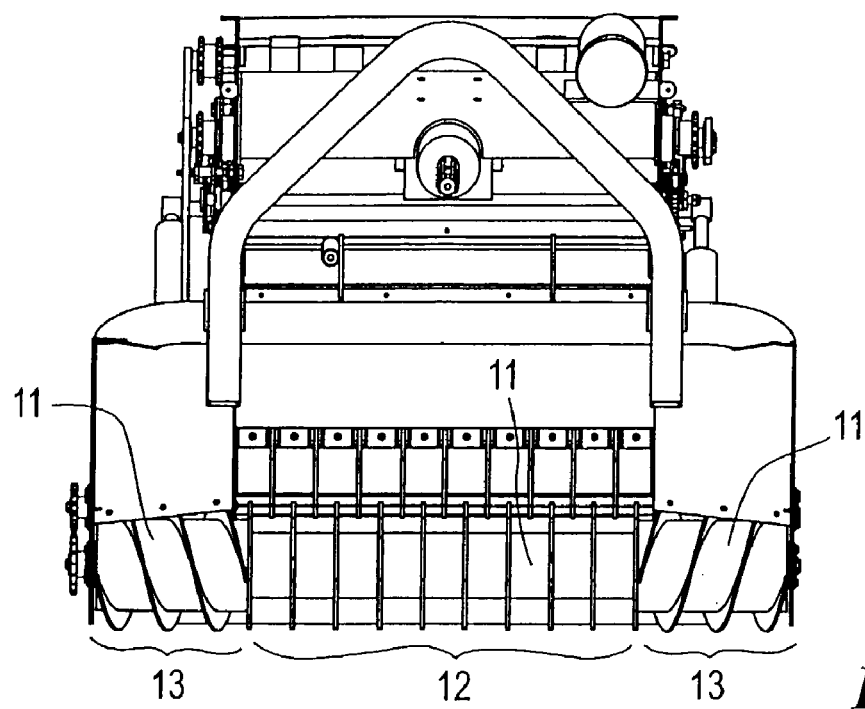
FIG. 1 is a front view of the compacting machine according to the invention.

With reference to FIG. 1, the compacting machine of the invention comprises means 11 for introducing the material to be compacted into a rear lying compaction chamber 1, not visible in the figure. The compacting machine comprises a central part 12 and two lateral components 13.

Figure 2:
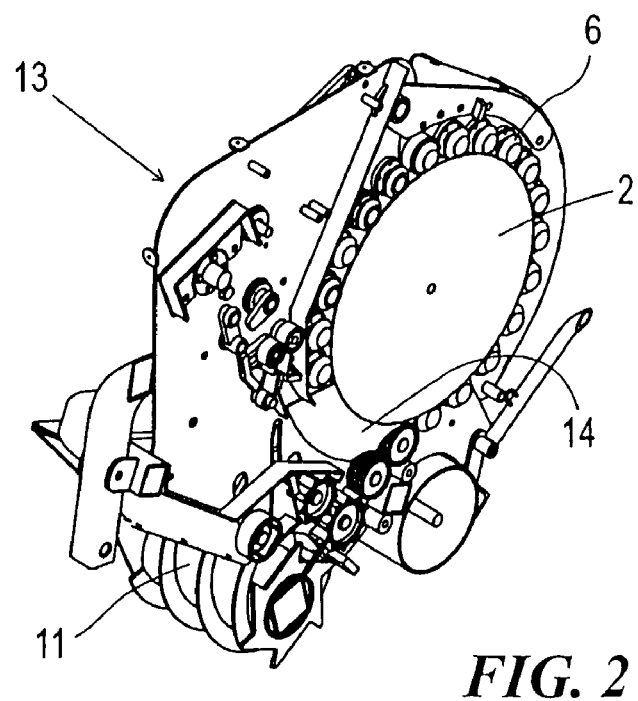
FIG. 2 is a perspective view of a lateral component of the compacting machine.

FIG. 2 shows a lateral component 13 of the compacting machine viewed on that side facing the central part 12. It can be seen that this lateral component comprises a circular plate 2 acting as an end wall for the compaction chamber 1. Said plate 2 is free to rotate about the axis of the compaction chamber, which passes through the centre of the plate 2. About the entire edge of the plate 2 there are disposed a plurality of perimetral hubs 6 (for clarity only one of these is indicated by the reference numeral 6 in the figure) which cover the entire perimeter of the plate 2 with the exception of a portion at the mouth through which the material to be compacted is introduced.

Figure 3:
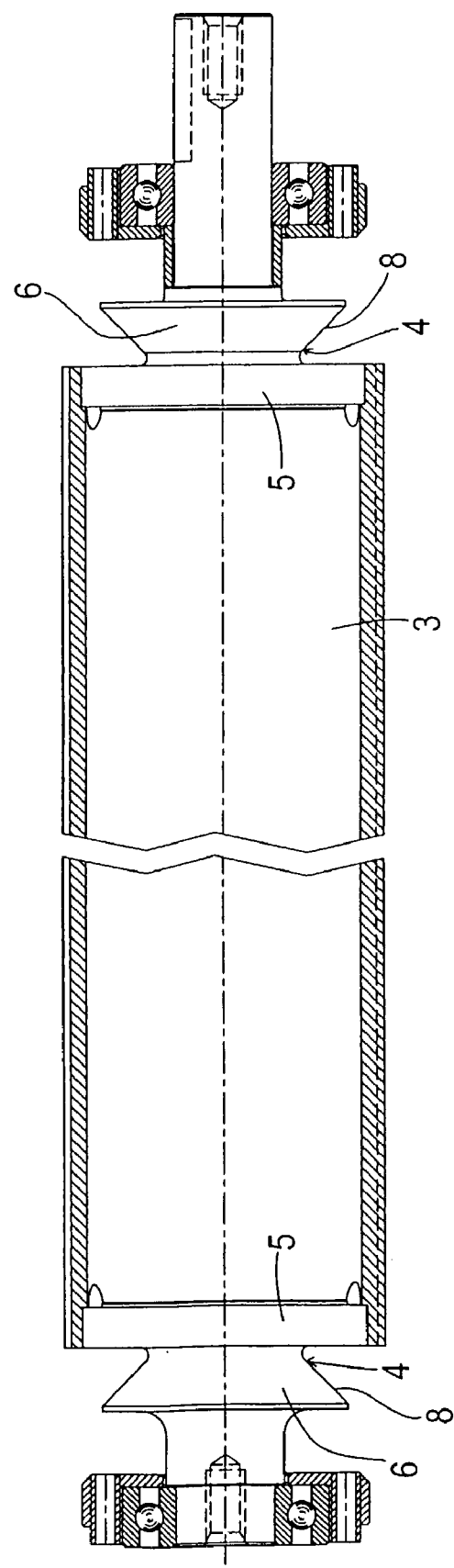
FIG. 3 is a longitudinal section through the ends of one of the perimetral rollers.

With reference to FIG. 3 it can be seen that each of said perimetral hubs 6 can be connected to the endpiece 5 of a perimetral roller 3. Said perimetral rollers when connected to the perimetral hubs 6 define the lateral surface of the compaction chamber, with the exception of the mouth through which the material to be compacted is introduced. The surfaces of the perimetral hub 6 and of the endpiece 5 of the perimetral rollers 3 define an engagement groove 4 for receiving the edge of the plate 2.

Figure 4:
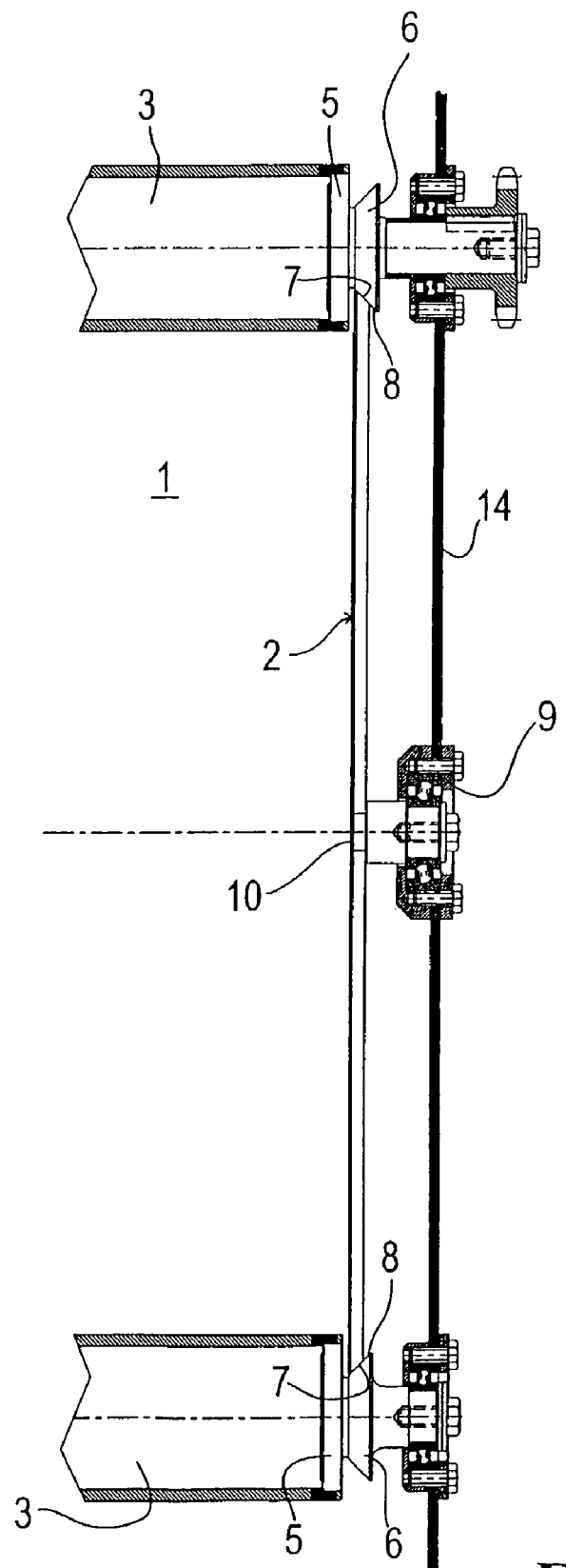
FIG. 4 is a longitudinal section through one end of the compaction chamber showing the end plate and only the upper and lower of the perimetral rollers.

With reference to FIG. 4, the plate 2 is inserted into the plurality of those engagement grooves 4 lying on the same side of the compacting machine. Said plate 2 preferably presents an edge with a first flaring 7 arranged to rest against a second flaring 8 on the perimetral hubs 6. The plate 2 is supported at its centre by a support hub 9 which fits into a central hole 10. On the outside of the machine a fixed wall 14 acts as a support both for the perimetral hubs 6 and for the support hub 9.

Figure 5:
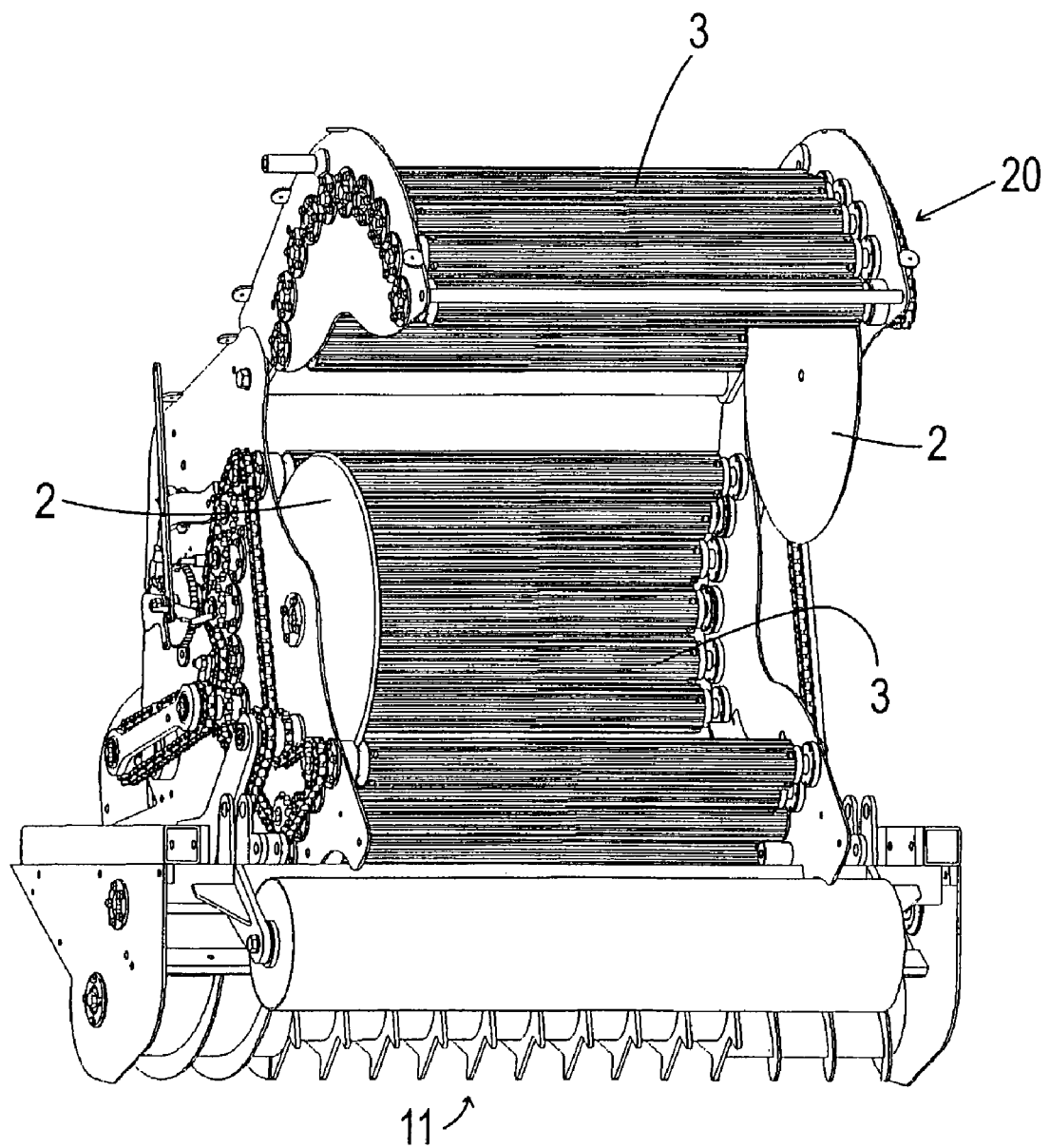
FIG. 5 is a perspective view of the compacting machine of the invention in its open state.

The material to be compacted is introduced tangentially by the introduction means 11 into the compaction chamber 1. The motorized perimetral rollers 8 each rotate about its axis such as to facilitate circular movement of the material to be compacted within the compaction chamber 1. The plates 2 positioned at the ends of the compaction chamber 1 rotate, entrained by the movement of the perimetral rollers and of the material to be compacted, hence reducing rubbing of the material to be compacted and enabling a less powerful machine to be used. As the amount of material introduced into the compaction chamber 1 increases, the material begins to press against the perimetral rollers 3 defining the lateral wall of the compaction chamber 1. The force which presses against the perimetral rollers 3 is equal to the compaction force which said perimetral rollers 3 exert on the material to be compacted within the compaction chamber 1. To expel the cylindrical bale of compacted material formed in this manner an upper portion 20 of the machine is opened in the manner of a gate, as can be seen in FIG. 5. The fixed wall 14 remains rigid with the machine, the left plate 2 remaining fixed to it. In contrast, the right plate 2 is fixed onto a wall connected to the movable portion 20, and rises with it. The rotation of the perimetral rollers 3 and the consequent rotation of the plates 2 determine and facilitate the exit of the compacted material bale formed by "unscrewing".

Advantageously the device comprises a substantially cylindrical compaction chamber 1 and two freely rotatable plates 2, one for each end of said chamber. Each of said plates 2 extends to completely cover the end of the compaction chamber 1. Their edge is restrained by insertion into the engagement groove 4, so limiting deformation of the plates 2 under the action of the material to be compacted. The plates 2 can also be provided with stiffening ribs which limit their deformation.

The support hub 9 can be of conical or frusto-conical shape suitable for insertion into a complementary flaring present at the centre of the plate 2.

The machine can also comprise a motor connected to the support hub 9 to rotate the plate 2 which, by suitable engagement with the perimetral hubs 6 achieved for example by gear toothing, rotates the perimetral rollers 3.

The invention claimed is:

1. A compacting machine comprising a compaction chamber (1) connected to introduction means (11) arranged to forcedly introduce a predetermined quantity of material to be compacted into the compaction chamber (1) by conferring on said material a substantially rotary movement, wherein said compaction chamber (1):

comprises at least one plate (2) made to rotate about an axis perpendicular to the plate (2) and arranged to at least partly close said compaction chamber (1) laterally;

said compaction chamber is substantially cylindrical, said compaction chamber has two substantially circular end walls, one of said substantially circular end walls positioned adjacent to an outer surface of the at least one plate, said compaction chamber has a lateral surface defined by longitudinally disposed perimetral rollers (3), each perimetral roller (3) being rotatable about its axis, said perimetral rollers mounted to said two substantially circular end walls, and wherein said plate (2) presents a circular shape, the edge of said plate (2) engages in engagement grooves (4) provided at the ends of said perimetral rollers (3) in correspondence with at least one of said substantially circular end walls of said compaction chamber (1).

2. A compacting machine as claimed in claim 1, wherein said plate (2) is positioned in correspondence with one of the two said end walls.

3. A compacting machine as claimed in claim 1, wherein said at least one plate (2) comprises plates (2) for each of said end walls of said compaction chamber (1).

4. A compacting machine as claimed in claim 1, wherein said compaction chamber (1) is at least partly bounded by said perimetral rollers (3).

5. A compacting machine as claimed in claim 1, wherein at least one of said perimetral rollers (3) presents two endpieces (5), at least one of said two endpieces (5) engages a perimetral hub (6) forming therewith said engagement grooves (4).

6. A compacting machine as claimed in claim 1, wherein said plate (2) presents a first perimetral flaring (7) arranged to rest against a complementary second flaring (8) present in said engagement grooves.

7. A compacting machine as claimed in claim 1, wherein it comprises a support hub (9) to support said plate (2) at the centre of said end wall.

8. A compacting machine as claimed in claim 7, wherein said plate (2) presents a central hole (10) for receiving said support hub (9).

9. A compacting machine as claimed in claim 8, wherein said support hub (9) has an at least partly conical lateral surface.

10. A compacting machine as claimed in claim 9, wherein said central hole (10) presents a flaring arranged to engage on said support hub (9).

11. A compacting machine as claimed in claim 7, wherein said support hub (9) is made to rotate about its axis.

12. A compacting machine as claimed in claim 1, wherein said plate (2) presents stiffening ribs.

13. A compacting machine as claimed in claim 7, wherein a rotary movement imparted to said support hub (9) is transmitted to the plate (2) and to the perimetral rollers (3).

14. A compacting machine as claimed in claim 3, wherein it comprises compacted material extraction means including a machine upper portion (20) which opens, one of said plates (2) remaining fixed to said machine, the other of said plates (2) being connected to said machine upper portion (20) which opens.

\* \* \* \* \*